(12) United States Patent
Kwon et al.

(10) Patent No.: US 7,515,242 B2
(45) Date of Patent: Apr. 7, 2009

(54) LIQUID CRYSTAL DISPLAY DEVICE COMPRISING A THERMALLY CONDUCTIVE LAYER AND METHOD OF FABRICATING THE SAME

(75) Inventors: Keuk Sang Kwon, Kyoungsangbuk-do (KR); Myung Ho You, Kyoungsangbuk-do (KR); In Byeong Kang, Kumi-shi (KR); Young Sik Kim, Kyoungsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/875,292

(22) Filed: Jun. 25, 2004

(65) Prior Publication Data
US 2005/0094083 A1 May 5, 2005

(30) Foreign Application Priority Data
Oct. 30, 2003 (KR) .................. 10-2003-0076496

(51) Int. Cl.
G02F 1/1333 (2006.01)
G02F 1/1345 (2006.01)
G02F 1/133 (2006.01)

(52) U.S. Cl. .................. 349/161; 349/149; 349/152; 349/21

(58) Field of Classification Search .............. 349/161, 349/152, 20–21
See application file for complete search history.

(56) References Cited

U.S. PATENT DOCUMENTS

| | | | | |
|---|---|---|---|---|
| 4,093,355 A | * | 6/1978 | Kaplit et al. ................. | 349/161 |
| 5,559,614 A | * | 9/1996 | Urbish et al. ................. | 349/21 |
| 5,731,856 A | * | 3/1998 | Kim et al. ................. | 349/43 |
| 5,920,366 A | * | 7/1999 | Dehmlow et al. ........... | 349/161 |
| 6,069,679 A | * | 5/2000 | Joslin et al. ................. | 349/149 |
| 6,172,733 B1 | * | 1/2001 | Hong et al. ................. | 349/152 |
| 6,388,652 B1 | * | 5/2002 | Yamazaki et al. ............. | 345/98 |
| 6,885,412 B2 | * | 4/2005 | Ohnishi et al. ............... | 349/72 |
| 2003/0038910 A1 | * | 2/2003 | Nagano et al. .............. | 349/113 |
| 2003/0103181 A1 | * | 6/2003 | Imayama et al. ............ | 349/122 |

FOREIGN PATENT DOCUMENTS

| | | | |
|---|---|---|---|
| JP | 03290619 A | * | 12/1991 |
| JP | 9-258161 | | 10/1997 |
| JP | 10222086 A | * | 8/1998 |
| JP | 2002-40459 | | 2/2002 |
| JP | 2003-43515 | | 2/2003 |

* cited by examiner

*Primary Examiner*—David Nelms
*Assistant Examiner*—W. Patty Chen
(74) *Attorney, Agent, or Firm*—McKenna Long & Aldridge LLP

(57) ABSTRACT

A thin and compact liquid crystal display device includes a liquid crystal display panel with first and second substrates, each having a display area and a non-display area, which are bonded to each other and separated from each other by liquid crystal material. A thermally conductive layer is formed on any one of the first and second substrates to prevent the liquid crystal material from becoming too cool, thereby preventing temperature-dependent formation of bubbles within the liquid crystal material. Such a liquid crystal display device may be simply fabricated.

20 Claims, 22 Drawing Sheets

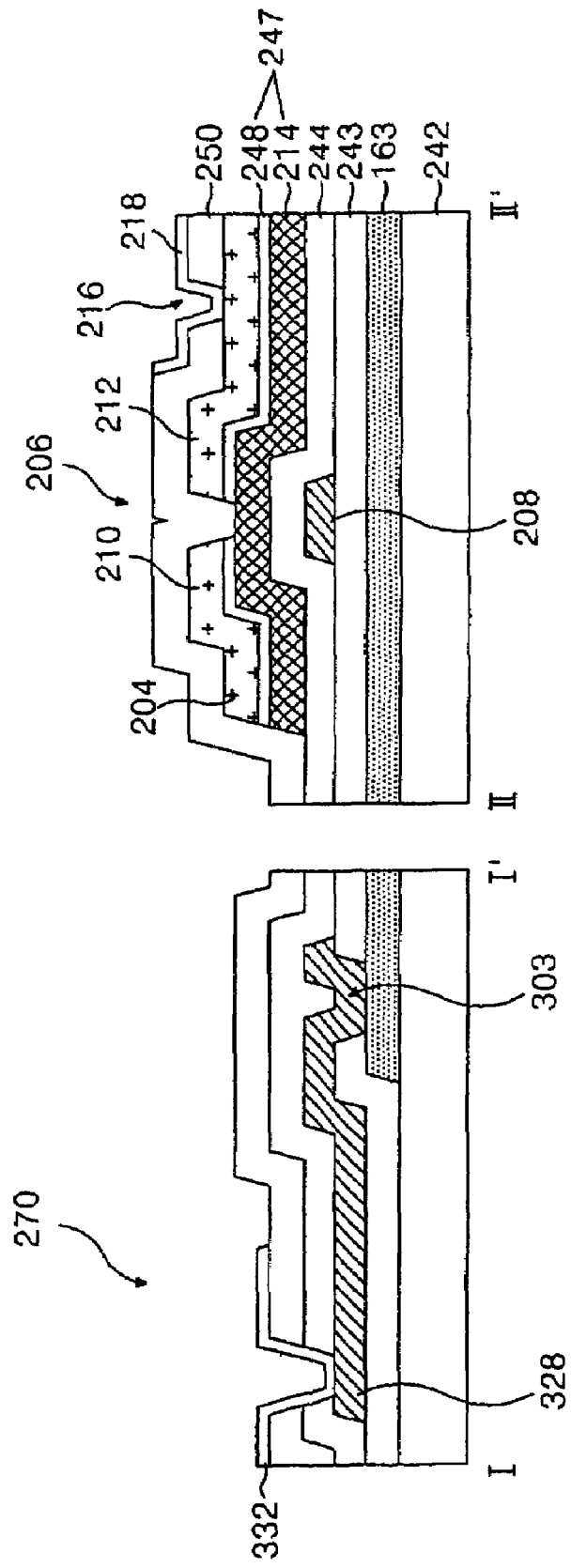

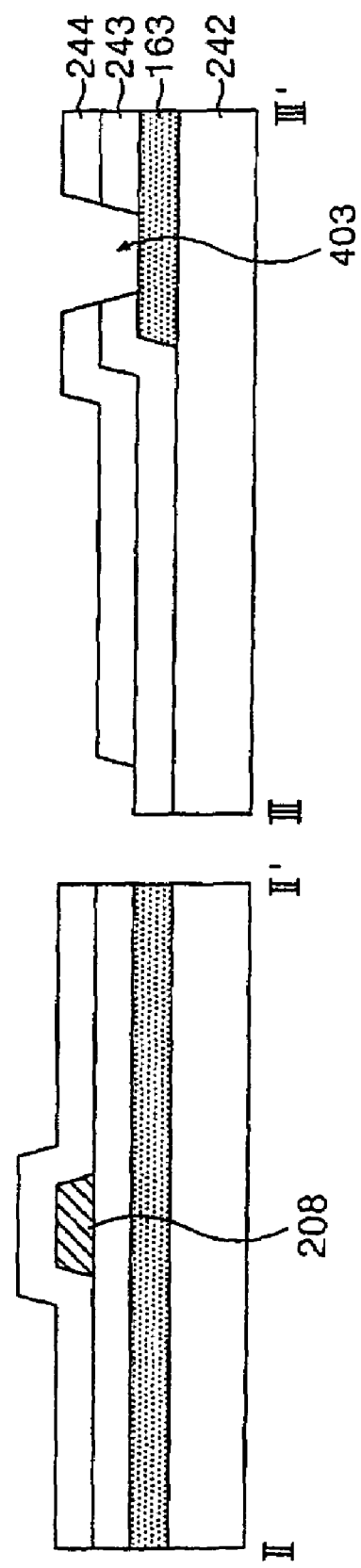

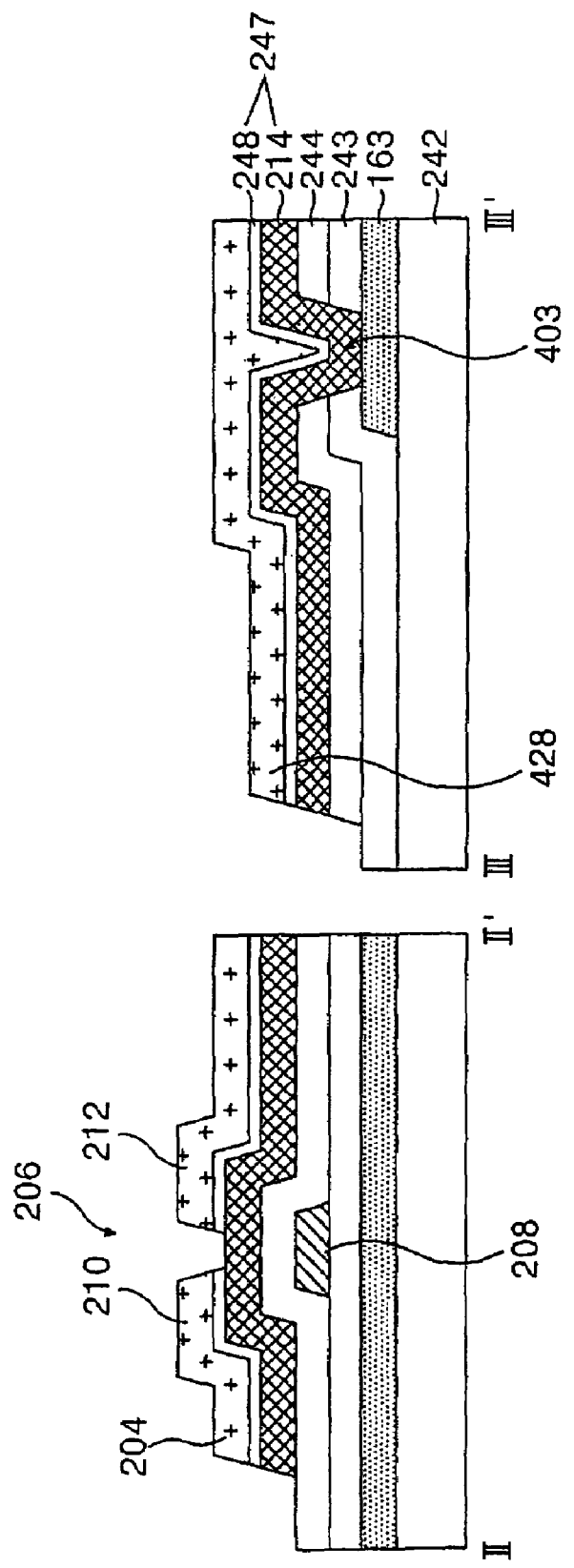

LIQUID CRYSTAL DISPLAY DEVICE COMPRISING A THERMALLY CONDUCTIVE LAYER AND METHOD OF FABRICATING THE SAME

This application claims the benefit of Korean Patent Application No. P2003-76496, filed on Oct. 30, 2003, which is hereby incorporated by reference for all purposes as if fully set forth herein.

BACKGROUND OF THE INVENTION

1. Field of the Invention

The present invention relates to liquid crystal display (LCD) devices. More particularly, the present invention relates to a simplified method of fabricating thin, light-weight LCD devices.

2. Discussion of the Related Art

A typical liquid crystal display (LCD) device includes a liquid crystal module (LCM), a driving circuit that drives the LCM, and a case that covers an exterior of the LCM to prevent the LCM from being damaged by external impact.

The LCM includes an LCD panel, a backlight unit, and a plurality of optical sheets that vertically redirect light emitted from the backlight unit to the LCD panel. The LCD panel generally includes a plurality of liquid crystal cells arranged in a matrix pattern between two substrates. The LCD panel, backlight unit, and optical sheets are integrally combined with each other to prevent light loss. LCMs such as those described above can be used within display devices of notebook personal computers, mobile vehicles, airplanes, and other portable devices.

FIG. 1 illustrates a sectional diagram of a related art LCM.

Referring to FIG. 1, a related art LCM includes an LCD panel 2 having a plurality of liquid crystal cells arranged in a matrix pattern; upper and lower polarizers 42 and 40, respectively, arranged at front and rear surfaces of the LCD panel 2, respectively, wherein the lower polarizer 40 is arranged on a heat conductor 66.

The LCD panel 2 includes a thin film transistor (TFT) array substrate 2a and a color filter array substrate 2b are bonded together and separated from each other by liquid crystal material (not shown). The TFT array substrate 2a includes a lower substrate supporting a plurality of TFTs and signal lines while the color filter array substrate 2b includes an upper substrate supporting a black matrix layer and a plurality of color filters.

The lower polarizer 40 is attached to a rear surface of the TFT array substrate 2a to polarize light emitted from the backlight unit into the LCD panel 2. The upper polarizer 42 is attached to a front surface of the color filter array substrate 2b to polarize light emitted from the backlight unit and transmitted by the LCD panel 2. The lower polarizer 40 is further bonded to the heat conductor 66 via an adhesive 35.

Referring back to FIG. 1, the aforementioned backlight unit includes a lamp 20 to emit light, a lamp housing 10 covering the lamp 20, a light guide panel 24 to convert light emitted from the lamp 20 into planar light, a reflective plate 26 arranged at a rear surface of the light guide panel 24, and a plurality of diffusion sheets 30 sequentially arranged on the light guide panel 24.

Referring to FIGS. 1 and 2, the heat conductor 66 includes a supporting substrate 65, a thermally conductive layer 63 formed on the supporting substrate 65, and a thermally conductive line 61 formed at peripheral areas of the thermally conductive layer 63. The supporting substrate 65 is formed of the same material as the upper/lower substrate of the LCD panel 2 (i.e., glass). The thermally conductive layer 63 is formed of a transparent conductive material such as indium tin oxide (ITO). The thermally conductive line 61 is formed of silver (Ag) material and transmits a voltage generated by an external voltage source (not shown). The thermally conductive layer 63 converts the voltage transmitted by the thermally conductive line 61 into heat and conducts the heat to the LCD panel 2, wherein the conducted heat prevents a temperature of liquid crystal material within the LCD panel 2 from becoming too low.

Specifically, when the LCD panel 2 is exposed to temperatures in the range of about −40 to 0° C., bubbles form within the liquid crystal material of the LCD panel 2. Consequently, the bubbles alter and restrict the anisotropic dielectric characteristics of the liquid crystal material and prevent the LCD panel 2 from displaying pictures properly. Therefore, the voltage transmitted by the thermally conductive line 61 induces a resistive heating phenomenon in the thermally conductive layer 63, allowing the heat conductor 66 to act as a heater and prevent the formation of bubbles within the liquid crystal material of the LCD panel 2.

Use of the aforementioned related art LCM is, however, disadvantageous because the supporting substrate 65 is typically provided as a thick glass substrate. Therefore, both the weight and thickness of the entire related art LCM can be undesirably large. Further, while the heat conductor 66 of the related art LCM is attached directly to the lower polarizer 40 of the LCD panel 2, the heat conductor 66 and the LCD panel 2 must be formed in separate processes and are connected to separate voltage sources. Consequently, methods of fabricating the related art LCM, and an operation of the related art LCM, can become undesirably complex.

SUMMARY OF THE INVENTION

Accordingly, the present invention is directed to a liquid crystal display device and method of fabricating the same that substantially obviates one or more of the problems due to limitations and disadvantages of the related art.

An advantage of the present invention provides a simplified method of manufacturing thin, light-weight LCD devices Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device may, for example, include a liquid crystal display panel having first and second substrates bonded to each other and separated from each other by liquid crystal material, wherein at least one of the first and second substrates includes a display area and a non-display area; and a thermally conductive layer formed on any one of the first and second substrates, wherein the thermally conductive layer prevents the temperature-dependent formation of bubbles within the liquid crystal material.

In one aspect of the present invention, the liquid crystal display device may further include a thermal signal conductor formed on any one of the first and second substrates and connected to the thermally conductive layer.

In another aspect of the present invention, the thermal signal conductor may, for example, be formed within the non-display area.

In still another aspect of the present invention, the liquid crystal display device may further include a printed circuit board (PCB) and a thermal signal generator mounted on the PCB, wherein the thermal signal generator supplies a thermal signal to the thermal signal conductor; and a tape carrier package (TCP) connecting the PCB to the thermal signal conductor.

In yet another aspect of the present invention, two or more thermal signal conductors may be connected to the TCP.

In still another aspect of the present invention, a first insulating film formed on the thermally conductive layer; a first contact hole may be formed in the first insulating film to expose the thermally conductive layer; a gate pattern, including a gate electrode and a gate line, may be formed on the first insulating film; a second insulating film may be formed on the gate pattern; a source/drain pattern, including a data line, a source electrode, and a drain electrode, may be formed on the second insulating film; a protective film may be formed on the source/drain pattern; a second contact hole may be formed in the protective film to expose the drain electrode; and a pixel electrode may be connected to the drain electrode through the second contact hole.

In yet another aspect of the present invention, the thermal signal conductor may, for example, include a first thermal signal electrode connected to the thermally conductive layer, wherein the first insulating film is between the first thermal signal electrode and the thermally conductive layer; and a second thermal signal electrode connected to the first thermal signal electrode, wherein the second insulating film and the protective film are between the second and first thermal signal electrodes.

In still another aspect of the present invention, the first thermal signal electrode may be formed of the same material as the gate pattern.

In yet another aspect of the present invention, the thermal signal conductor may, for example, include a first thermal signal electrode connected to the thermally conductive layer, wherein the first and second insulating films are between the first thermal signal electrode and the thermally conductive layer; and a second thermal signal electrode connected to the first thermal signal electrode, wherein the protective film is between the second and first thermal signal electrodes.

In still another aspect of the present invention, the first thermal signal electrode may be formed of the same material as the source/drain pattern.

In another aspect of the present invention, portions of the thermally conductive layer may be absent from regions of the display area occupied by portions of the gate and data lines.

In one aspect of the present invention, the thermally conductive layer may be formed of a transparent conductive material.

According to principles of the present invention, a method of fabricating a liquid crystal display device having a liquid crystal display panel with first and second substrates, each having a display area and a non-display area, bonded to each other and separated from each other by liquid crystal material, may, for example, include a step of forming a thermally conductive layer on any one of the first and second substrates to prevent the temperature-dependent formation of bubbles within the liquid crystal material.

In one aspect of the present invention, the method may further include a forming a thermal signal conductor on any one of the first and second substrates and connecting the thermal signal conductor to the thermally conductive layer.

In another aspect of the present invention, the thermal signal conductor may be formed in the non-display area.

In still another aspect of the present invention, the method may further include forming a printed circuit board (PCB); mounting a thermal signal generator wherein the thermal signal generator that supplies a thermal signal to the thermal signal conductor onto the PCB; and connecting the PCB to the thermal signal conductor using a tape carrier package (TCP).

In yet another aspect of the present invention, two or more thermal signal conductors may be connected to the TCP.

In still another aspect of the present invention, a first insulating film may be formed on the thermally conductive layer; a first contact hole may be formed within the first insulating film to expose the thermally conductive layer; a gate pattern, including a gate electrode and a gate line, may be formed on the first insulating film; a second insulating film may be formed on the gate pattern; a source/drain pattern, including a data line, a source electrode, and a drain electrode, may be formed on the second insulating film; a protective film may be formed on the source/drain pattern; a second contact hole may be formed within the protective film to expose the drain electrode; and a pixel electrode may be connected to the drain electrode through the second contact hole.

In another aspect of the present invention, the thermal signal conductor may, for example, be formed by connecting a first thermal signal electrode to the thermally conductive layer such that the first insulating film is between the first thermal signal electrode and the thermally conductive layer; and connecting a second thermal signal electrode to the first thermal signal electrode such that the second insulating film and the protective film are between the second and first thermal signal electrodes.

In one aspect of the present invention, the first thermal signal electrode may be formed of the same material as the gate pattern.

In another aspect of the present invention, the thermal signal conductor may, for example, be formed by connecting a first thermal signal electrode to the thermally conductive layer such that the first and second insulating films are between the first thermal signal electrode and the thermally conductive layer; and connecting a second thermal signal electrode to the first thermal signal electrode such that the protective film is between the second and first thermal signal electrodes.

In still another aspect of the present invention, the first thermal signal electrode may be formed of the same material as the source/drain pattern.

In yet another aspect of the present invention, portions of the thermally conductive layer may be removed from regions of the display area occupied by portions of the gate and data lines.

In still another aspect of the present invention, the thermally conductive layer may be formed of a transparent conductive material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 8A to 8F illustrate sectional views of a method of fabricating the thin film transistor array substrate shown in FIG. 5;

FIGS. 12A to 12F illustrate sectional views of a method of fabricating the thin film transistor array substrate shown in FIG. 11.

DETAILED DESCRIPTION OF THE ILLUSTRATED EMBODIMENTS

Reference will now be made in detail to embodiments of the present invention, examples of which are illustrated in the accompanying drawings.

Figure 1:
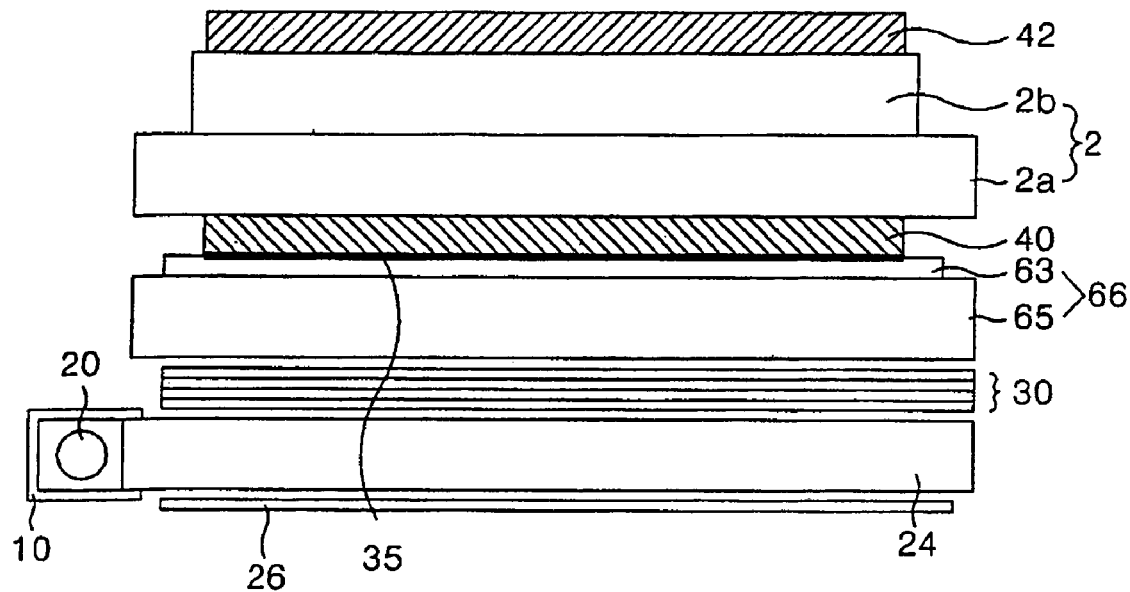
FIG. 1 illustrates a sectional view of a related art liquid crystal module of a liquid crystal display device.
Figure 2:
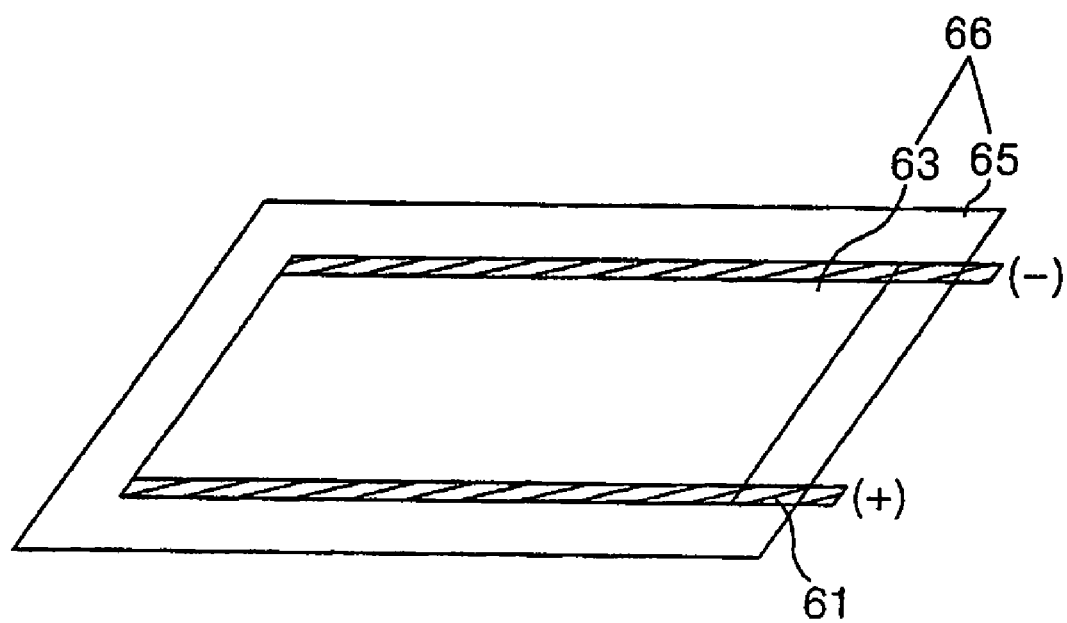
FIG. 2 illustrates a schematic view of a related art heat conductor shown in FIG. 1.
Figure 3:
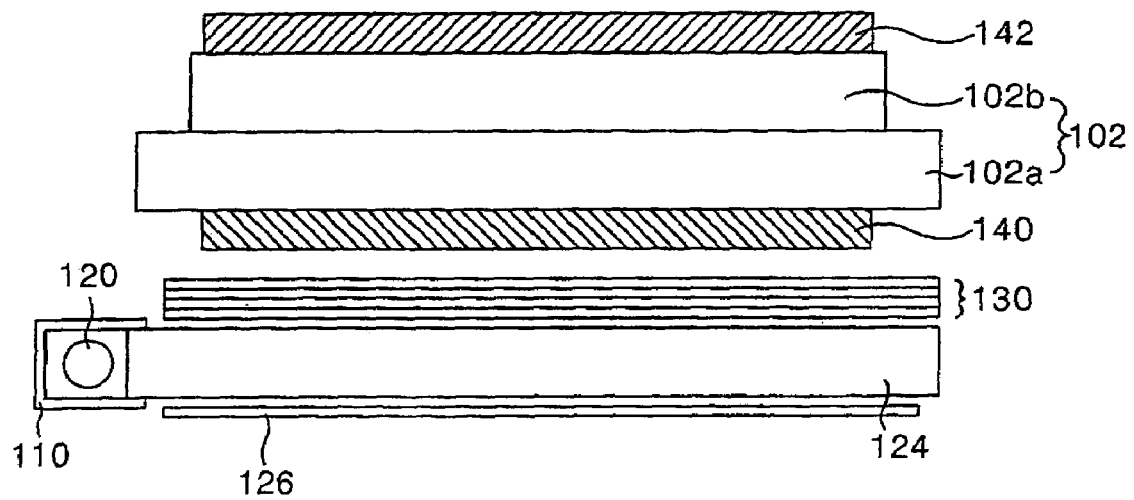
FIG. 3 illustrates a sectional view of a liquid crystal module according to a first embodiment of the present invention.

FIG. 3 illustrates a sectional view of a liquid crystal module (LCM) according to a first embodiment of the present invention.

Referring to FIG. 3, the LCM may, for example, include a liquid crystal display (LCD) panel 102 having a plurality of liquid crystal cells arranged in a matrix pattern. Upper and lower polarizers 142 and 140, respectively, may be arranged at front and rear surfaces of the LCD panel 102, respectively.

The LCD panel 102 may, for example, include a thin film transistor (TFT) array substrate 102a and a color filter array substrate 102b that are bonded together and separated from each other by liquid crystal material (not shown). As described in greater detail below, the TFT array substrate 102a may, for example, include a lower substrate supporting a plurality of TFTs, a plurality of signal lines, and a thermally conductive layer. The color filter array substrate 102b may, for example, include an upper substrate supporting a black matrix layer and a plurality of color filters.

The lower polarizer 140 may be attached to a rear surface of the TFT array substrate 102a to polarize the light emitted from a backlight unit into the LCD panel 102. The upper polarizer 142 may be attached to a front surface of the color filter array substrate 102b to polarize light emitted from the backlight unit and transmitted by the LCD panel 102.

The aforementioned backlight unit may, for example, include a lamp 120 to emit light, a lamp housing 110 covering the lamp 120, a light guide panel 124 to convert light emitted from the lamp 120 into planar light, a reflective plate 126 arranged at a rear surface of the light guide panel 124, and a plurality of diffusion sheets 130 sequentially arranged over the light guide panel 124.

Figure 4:
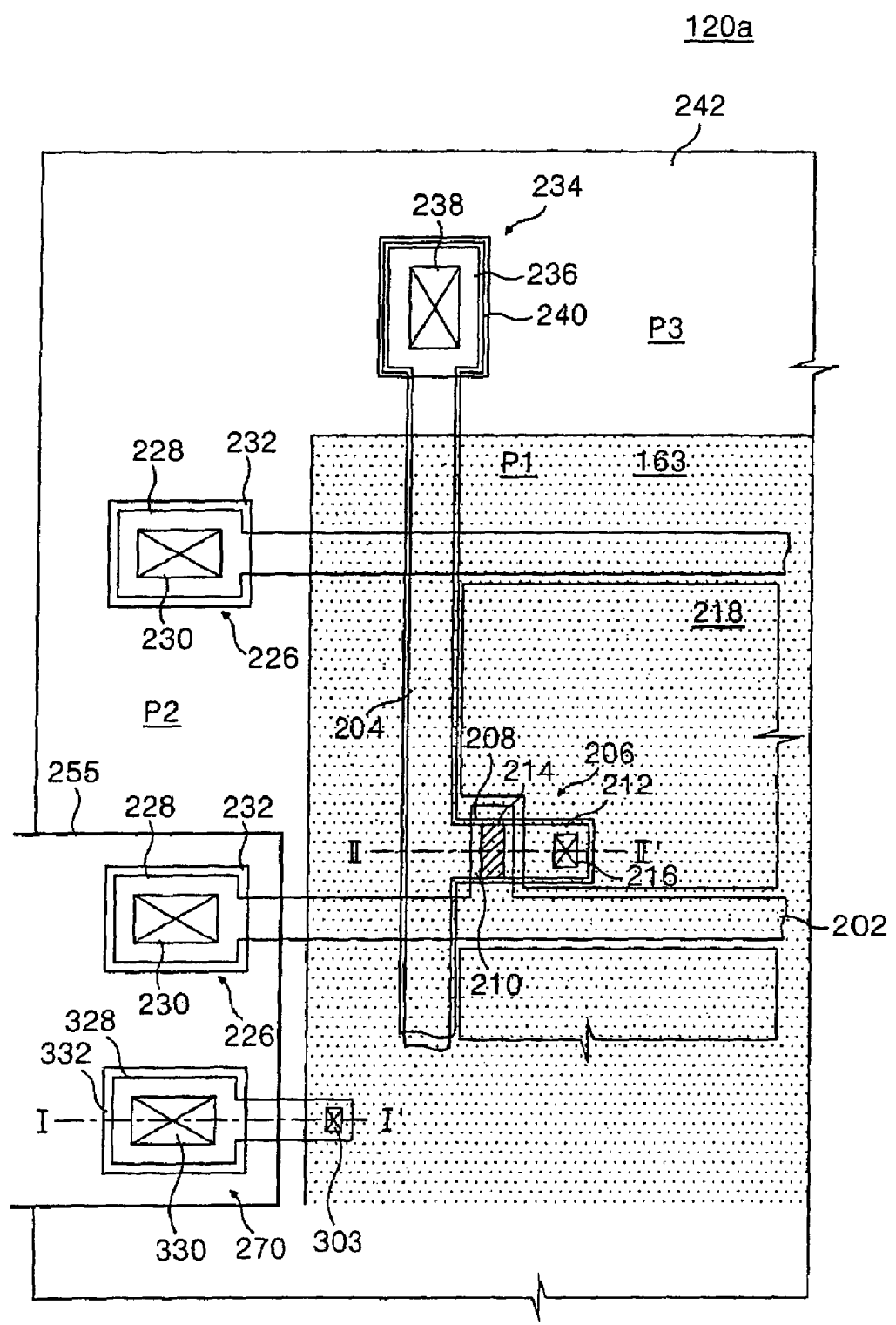
FIG. 4 illustrates a plan view of a thin film transistor array substrate shown in FIG. 3.
Figure 5:
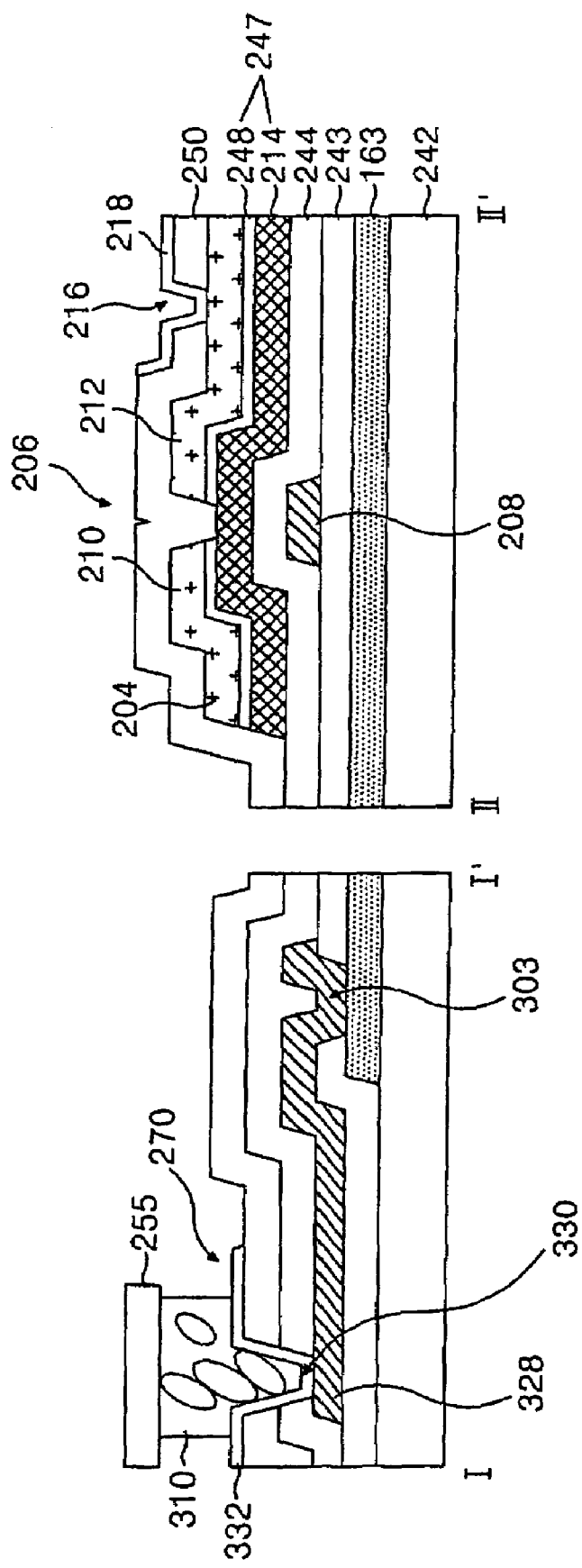
FIG. 5 illustrates a sectional view of the thin film transistor array substrate shown in FIG. 4, taken along the lines I-I' and II-II'.

FIG. 4 illustrates a plan view of a thin film transistor array substrate shown in FIG. 3. FIG. 5 illustrates a sectional view of the thin film transistor array substrate shown in FIG. 4, taken along the lines I-I' and II-II'.

Figure 6:
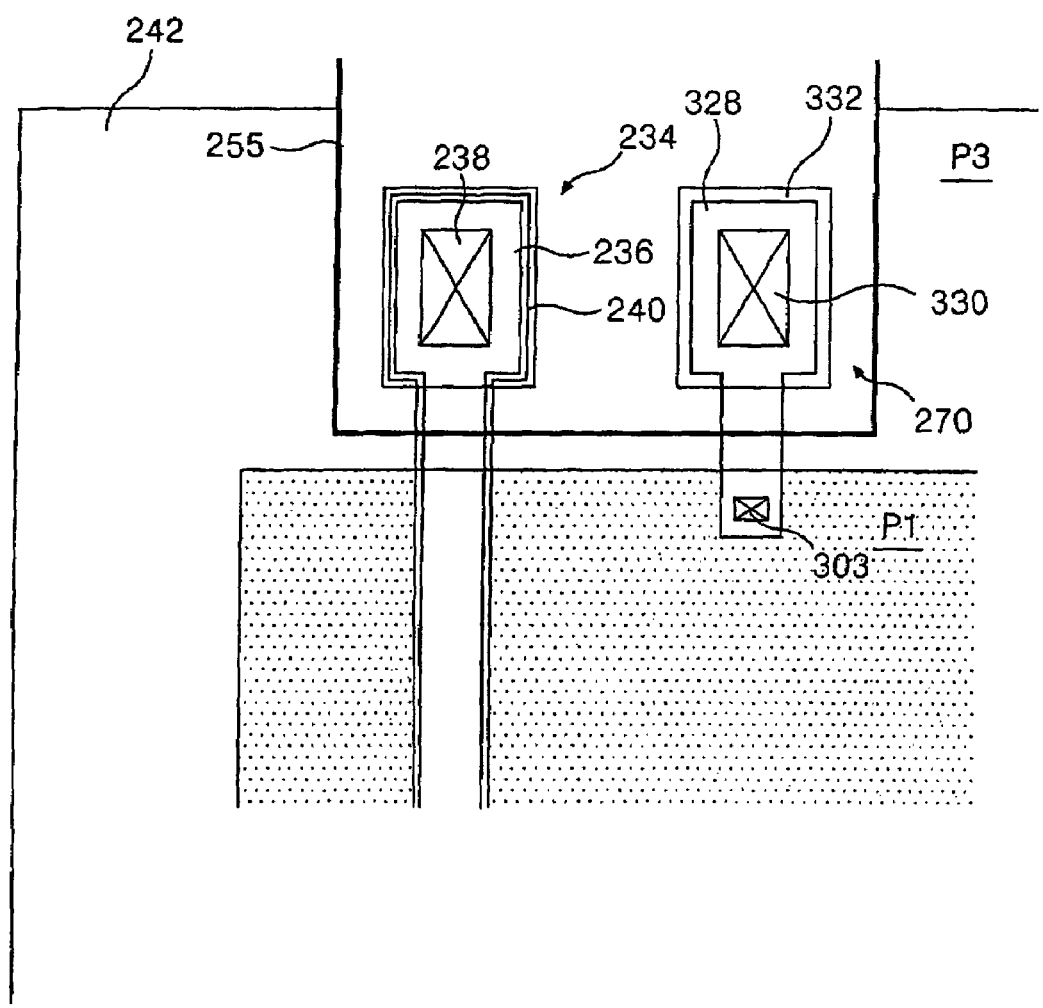
FIG. 6 illustrates a plan view of a thermal signal conductor formed within a data pad area.

Referring to FIGS. 4-6, the aforementioned TFT array substrate 102a may include a lower substrate 242 having a display area P1 and a non-display area (i.e., gate pad area P2 and data pad area P3).

Within the display area P1, a thermally conductive layer 163 may be formed on the lower substrate 242; a first insulating film 243 may be formed on the lower substrate 242 and the thermally conductive layer 163; gate lines 202 and data lines 204 may be formed over the first insulating film 243, be spaced apart from each other by a second insulating film 244, and may cross each other to define a plurality of cell areas; TFTs 206 may be formed at the crossings of the gate and data lines 202 and 204, respectively; and pixel electrodes 218 may be formed within the cell areas. Although not shown, storage capacitors may be formed at regions where the pixel electrodes 218 overlap preceding ones of the gate lines 202.

Each TFT 206 may, for example, include a gate electrode 208 connected to a corresponding gate line 202, a source electrode 210 connected to a corresponding data line 204, a drain electrode 212 connected to a corresponding pixel electrode 218, and a semiconductor layer 247 overlapping the gate electrode 208. The semiconductor layer 247 may, for example, include an active layer 214 and an ohmic contact layer 248 formed over the active layer 214. The active layer 214 may form a channel between the source and drain electrodes 210 and 212 while the ohmic contact layer 248 may facilitate ohmic contact between the source and drain electrodes 210 and 212 and the TFT 206. As shown in FIG. 5, the data line 204, the source electrode 210, and the drain electrode 212 overlap the active layer 214. Each pixel electrode 218 may be connected to a corresponding drain electrode 212 through a first contact hole 216 formed within the protective film 250.

Accordingly, each TFT 206 may transfer pixel voltage signals transmitted by the data line 204 to the pixel electrode 218 in response to gate signals transmitted by the gate line 202. As the pixel voltage signals are transmitted to the pixel electrode 218, the pixel electrode 218 generates a potential difference with a common electrode formed on the upper substrate (not shown). The potential difference causes liquid crystal material located between the TFT array substrate 102a and the color filter substrate 102b to rotate. The rotation causes an orientation of anisotropic dielectric characteristics to become modulated and enables light emitted from the backlight unit to be selectively transmitted through the pixel electrode 218 to the color filter substrate 102b.

Within the gate pad area P2, gate pad parts 226 may be connected to the gate lines 202. Within the data pad area P3, data pad parts 234 within a data pad area may be connected to the data lines 204. Further, a thermal signal conductor 270 may be electrically connected to the thermally conductive layer 163.

Each gate pad part 226 may connect a corresponding gate line 202 to a gate driver (not shown). In one aspect of the present invention, each gate pad part 226 may include a lower gate pad electrode 228 extending from the gate line 202 and an upper gate pad electrode 232 connected to the lower gate pad electrode 228 via a second contact hole 230 formed in the second insulating film 244 and the protective film 250.

Each data pad part 234 may be connected to a corresponding data line 204 to a data driver (not shown). In one aspect of the present invention, the data pad part 234 may include a lower data pad electrode 236 extending from the data line 204 and an upper data pad electrode 240 connected to the data pad lower part electrode 236 via a third contact hole 238 formed in the protective film 250.

According to one aspect of the present embodiment, the thermal signal conductor 270 may be arranged within the gate pad area P2 and, for example, include a lower thermal signal electrode 328 connected to the thermally conductive layer 163 via a fourth contact hole 303 formed within the first insulating film 243 and an upper thermal signal electrode 332 connected to the lower thermal signal electrode 328 via a fifth contact hole 330 formed in the second insulating film 244 and the protective film 250. In one aspect of the present invention, the fourth contact hole may be formed within the display area P1.

According to principles of the present invention, the thermal signal conductor 270 may be connected to a tape carrier package (TCP) 255 via conductive film 310. In one aspect of the present invention, the conductive film 310 may, for example, include electrically conductive particles (e.g., balls). Accordingly, the thermal signal conductor 270 may transmit a voltage (i.e., a thermal signal) supplied from a power source (i.e., a thermal signal generator) mounted on a printed circuit board (PCB) (not shown) to the thermally conductive layer 163 via the TCP 255. In one aspect of the present invention, the thermal signal conductor 270 may, for example, transmit a voltage having a positive polarity (+) or a negative polarity (−). The voltage transmitted by the thermal signal conductor 270 may then be converted into heat by the thermally conductive layer 163 and supplied to the LCD panel 102 to prevent the aforementioned temperature-dependent formation of bubbles within liquid crystal material of the LCD panel 102.

As mentioned above, when the LCD panel 102 is exposed to an environment within a predetermined temperature range (e.g., around −40~0° C.) bubbles form within the liquid crystal material of the LCD panel 102. The bubbles, in turn, deleteriously alter and restrict the anisotropic dielectric characteristics of the liquid crystal material and prevent the LCD panel 102 from displaying pictures properly. Therefore, the voltage transmitted by the thermal signal conductor 270 induces a resistive heating phenomenon in the thermally conductive layer 163 such that the thermally conductive layer 163 acts as a heater to prevent the formation of bubbles with the liquid crystal material of the LCD panel 102.

In one aspect of the present invention, the thermally conductive layer 163 may, for example, be formed of a transparent electrically conductive material such as indium tin oxide (ITO), or the like. In another aspect of the present invention, the thermally conductive layer may, for example, be about 300~2000 Å thick to possess an internal resistance of about 30~100Ω.

As described above with respect to FIG. 4, the thermal signal conductor 270 is arranged within the gate pad area P2. However, the thermal signal conductor 270 of the present invention may be arranged within the data pad area P3, as shown in FIG. 6.

Figure 7:
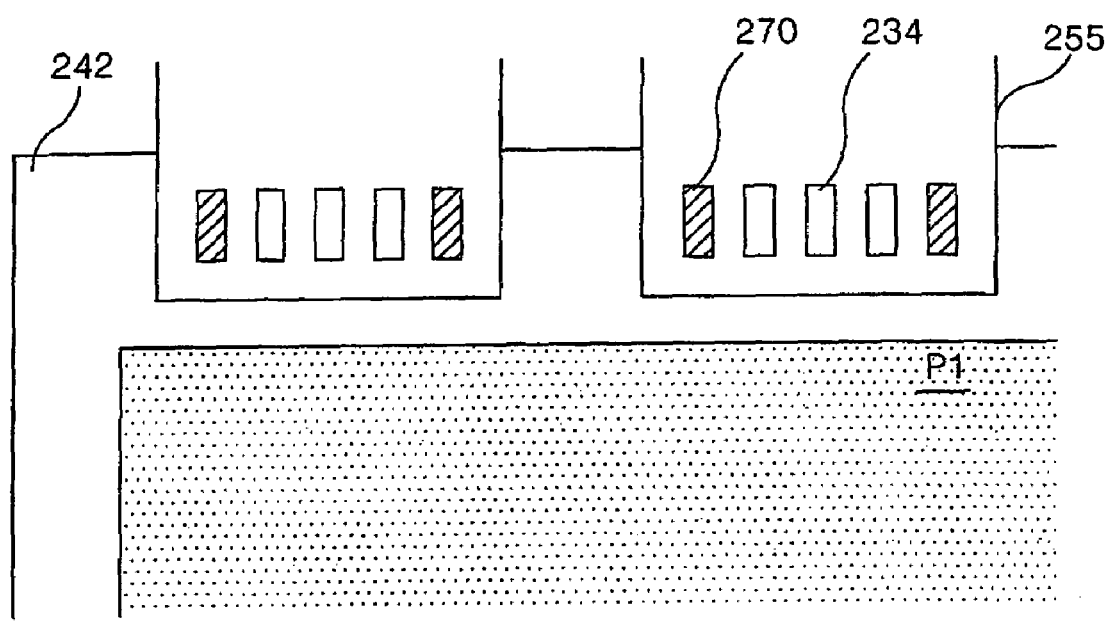
FIG. 7 illustrates a plan view of two or more thermal signal conductors connected to one tape carrier package.

As described above, with respect to FIGS. 4 and 6, only one thermal signal conductor 270 is illustrated as being connected to the thermally conductive layer 163. However, and as exemplarily illustrated in FIG. 7, a plurality of thermal signal conductors 270 may be connected to the thermally conductive layer 163. In one aspect of the present invention, individual ones of the plurality of thermal signal conductors 270 may or may not be connected to the same TCP 255.

FIGS. 8A to 8F illustrate sectional views of a method of fabricating the thin film transistor array substrate shown in FIG. 5.

Figure 8A:
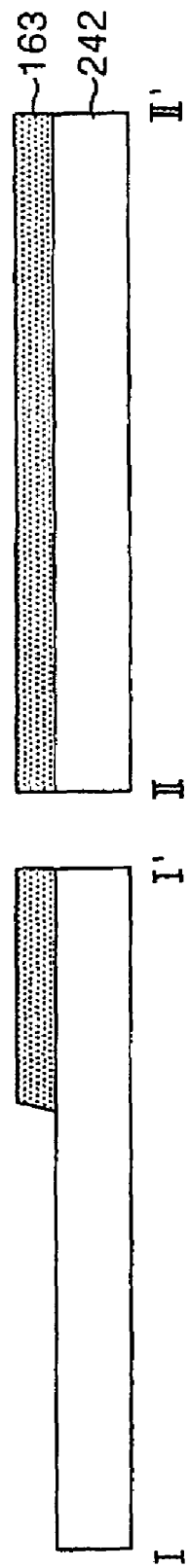

Referring to FIG. 8A, the thermally conductive layer 163 may be formed on the lower substrate 242. In one aspect of the present invention, the thermally conductive layer 163 may be formed through a deposition method such as sputtering, or the like. In another aspect of the present invention, the thermally conductive layer 163 may be formed of an electrically conductive material. In still another aspect of the present invention, the thermally conductive layer 163 may be formed of an electrically conductive material such as indium tin oxide (ITO), or the like.

Figure 8B:
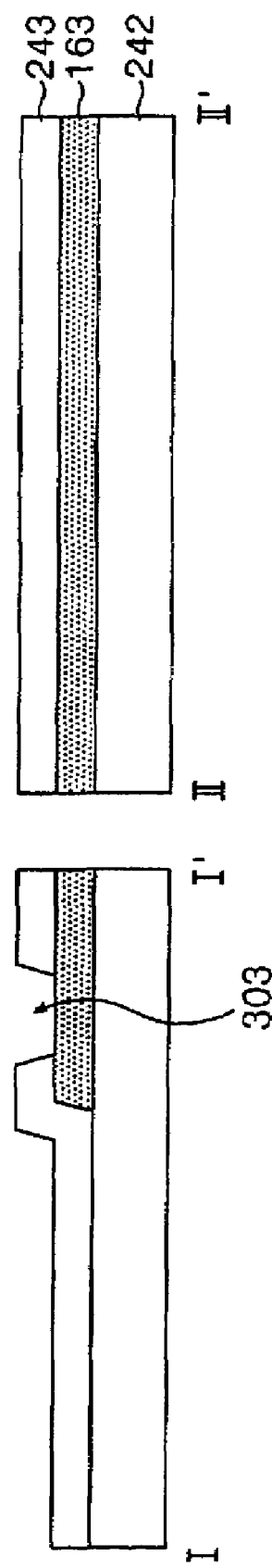

Referring to FIG. 8B, the first insulating film 243 may be formed on the lower substrate 242 and the thermally conductive layer 163. Further, the fourth contact hole 303 may be formed in the first insulating film 243 to expose a portion of the thermally conductive layer 163. In one aspect of the present invention, the first insulating film 243 may include an inorganic insulating material such as silicon oxide (SiOx), silicon nitride (SiNx), or the like. In another aspect of the present invention, the fourth contact hole 303 may be formed by photolithography and etching processes using a mask.

Figure 8C:
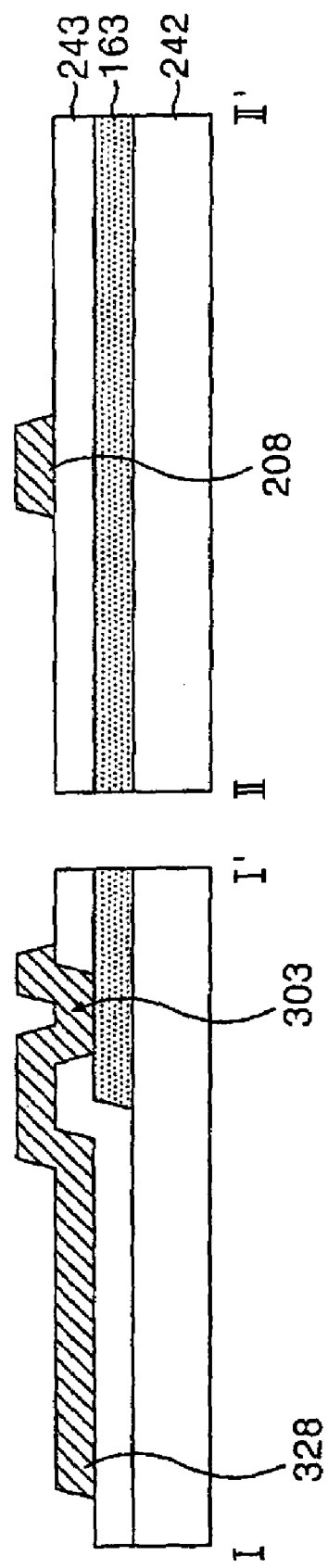

Referring to FIG. 8C, a gate metal layer may be formed over the lower substrate 242 and on the first gate insulating film. In one aspect of the present invention, the gate metal layer may be formed through a deposition method such as sputtering, or the like. Subsequently, the gate metal layer may be patterned via photolithography and etching processes using a mask to form gate patterns including the gate line 202, the gate electrode 208, and the lower thermal signal electrode 328. In one aspect of the present invention, the gate metal layer may include chrome Cr, molybdenum Mo, aluminum Al, or the like, or alloys or layered combinations (e.g., two layers) thereof.

Figure 8D:
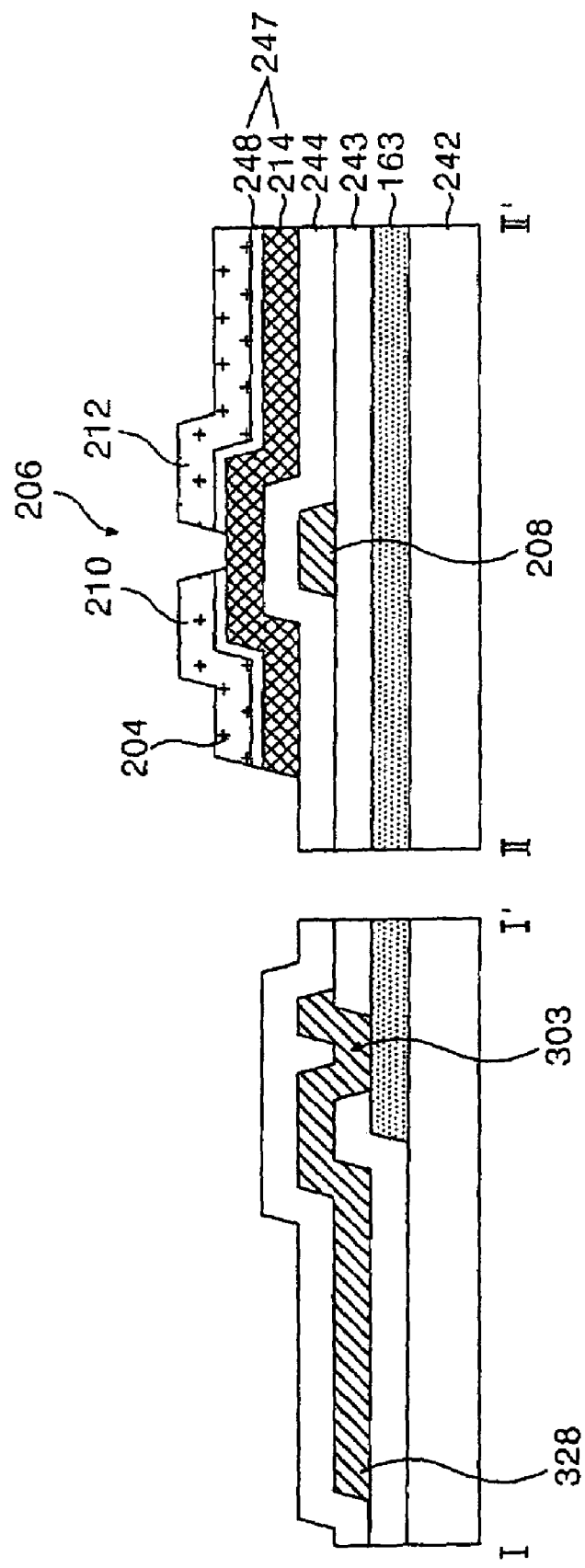

Referring to FIG. 8D, the second insulating film 244, a semiconductor layer, a doped semiconductive layer, and a source/drain metal layer may be sequentially formed over the lower substrate 242 and on the first insulating film 243, the gate lines 202, the gate electrode 208, and the lower thermal signal electrode 328. In one aspect of the present invention, the second insulating film 244 may include an inorganic insulating material such as silicon oxide (SiOx), silicon nitride (SiNx), or the like. In another aspect of the present invention, the semiconductor layer may be used to form the active layer 214 and may comprise an amorphous silicon layer. In still another aspect of the present invention, the doped semiconductive layer may be used to form the ohmic contact layer 248 and may comprise an n+ amorphous silicon layer. In yet another aspect of the present invention, the source/drain metal layer may include molybdenum (Mo), titanium (Ti), tantalum (Ta), or the like, or any alloy or layered combination thereof. In still a further aspect of the present invention, the second insulating film 244, the semiconductor layer, the doped semiconductive layer, and the source/drain metal layer may be sequentially formed using a deposition method such as plasma enhanced chemical vapor deposition (PECVD), sputtering, or the like.

After sequential formation of the second insulating film 244, the semiconductor layer, the doped semiconductive layer, and the source/drain metal layer, source and drain electrodes 210 and 212, respectively, may be formed by patterning the source/drain metal layer via a photolithography process and a photoresist mask. In one aspect of the present invention, the mask used in forming the source and drain electrodes 210 and 212, respectively, may comprise a diffractive exposure mask having a diffractive exposure area arranged in correspondence with the channel of the TFT. Thus, a portion of the mask arranged over the channel of the TFT may be lower in height than a portion of the mask arranged over the source/drain area of the TFT. After formation of the mask, the source/drain metal layer may be patterned by a wet etching process using the photoresist pattern as a mask. Upon completion of the patterning, the data line 204, the source electrode 210, and the drain electrode 212, are simultaneously formed.

After patterning the source/drain metal layer to form the data line 204, the source electrode 210, and the drain electrode 212, the semiconductor layer and the doped semiconductive layer may be simultaneously patterned to form the active layer 214 and the ohmic contact layer 248, respectively. In one aspect of the present invention, the semiconductor layer and the doped semiconductive layer may be patterned via a dry etching process using the same photoresist pattern as was used to form the source and drain electrodes 210 and 212.

After patterning the semiconductor layer and the doped semiconductive layer to form the active layer 214 and the ohmic contact layer 248, the portion of the photoresist pattern arranged over the channel of the TFT (i.e., the portion of the photoresist having the relatively lower height) may be removed in an ashing process. Subsequently, portions of the source/drain metal layer and the ohmic contact layer 248 arranged over the channel of the TFT may be etched in a dry etching process to expose the portion of the active layer 214 corresponding to the channel of the TFT and to separate the source electrode 210 from the drain electrode 212. After exposing the active layer 214 and separating the source and drain electrodes 210 and 212, respectively, any remaining photoresist pattern may be removed in a stripping process.

Figure 8E:
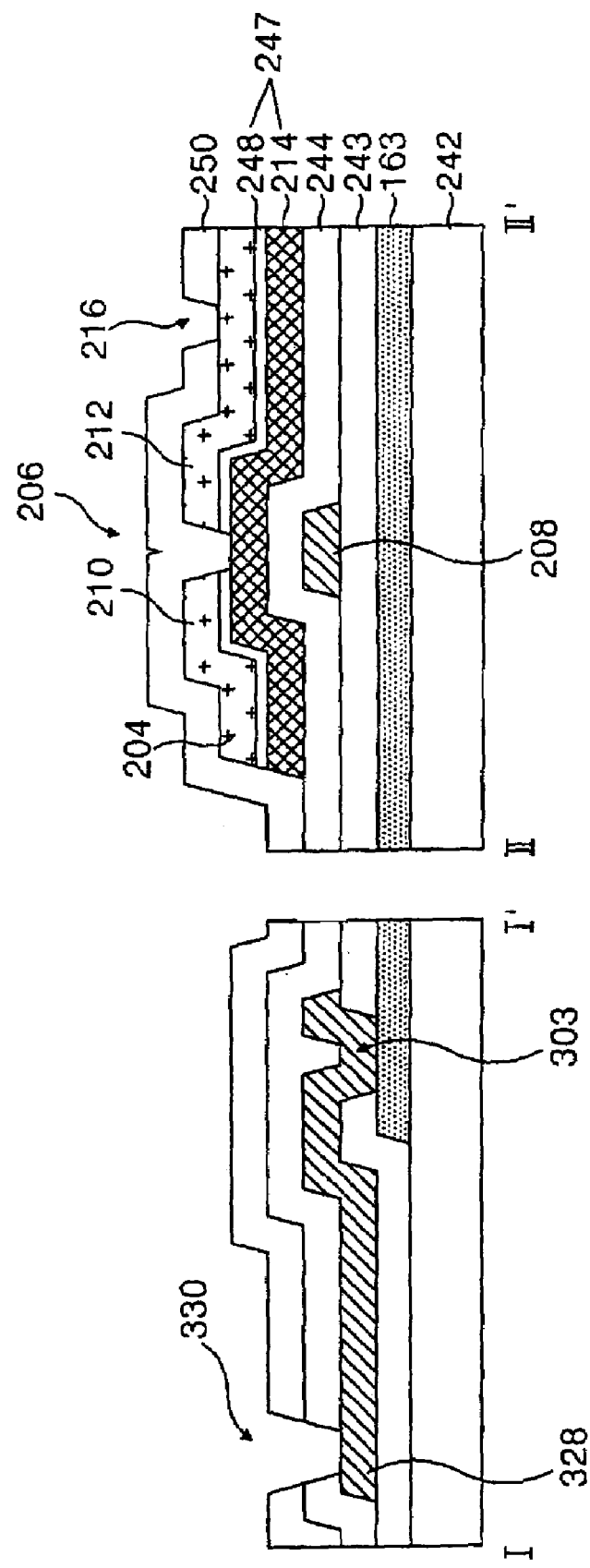

Referring to FIG. 8E, the protective film 250 may be formed over the entire surface of the lower substrate 242 and on the second insulating film 244, the source electrode 210 and the drain electrode 212. In one aspect of the present invention, the protective film 250 may be formed by a deposition method such as PECVD. In another aspect of the present invention, the protective film 250 may be formed of the same inorganic insulating material as the first and second insulating film 243 and 244, or from an organic insulating material such as an acrylic organic compound having a low dielectric constant (e.g., BCB, PFCB, etc.), or the like. The first contact hole 216 may be formed in the protective film 250, and the fifth contact hole 330 may be formed within the protective film 250 and second insulative film 244 by photolithography and etching processes using a mask. Accordingly, the first contact hole 216 may expose a portion of the drain electrode 212 and the fifth contact hole 330 may expose a portion of the lower thermal signal electrode 328.

Referring to FIG. 8F, a transparent, electrically conductive material may be formed on the protective film 250 and within the first and fifth contact holes 216 and 330. In one aspect of the present invention, the transparent, electrically conductive material may be formed through a deposition method such as sputtering, or the like. In another aspect of the present invention, the transparent, electrically conductive material may, for example, include indium tin oxide (ITO), tin oxide (TO), indium zinc oxide (IZO), or the like. Subsequently, the formed transparent, electrically conductive material may be patterned via the photolithography and etching processes using a mask to form the pixel electrode 218 and the upper thermal signal electrode 332. According to principles of the present invention, the pixel electrode 218 may be electrically connected to the drain electrode 212 via the first contact hole 216 while the upper thermal signal electrode 332 may be electrically connected to the lower thermal signal electrode 328 via the fifth contact hole 330.

As described above with respect to FIGS. 3-8F, the thermally conductive layer 163 may be formed directly on the lower substrate 242 of the TFT array substrate 102a. Accordingly, the separate supporting substrates and thermal conducting structures, such as those described in the related art, and their accompanying fabrication processes, are not required. Accordingly, the resultant LCM may be thinner and lighter and fabricated more simply.

Figure 9:
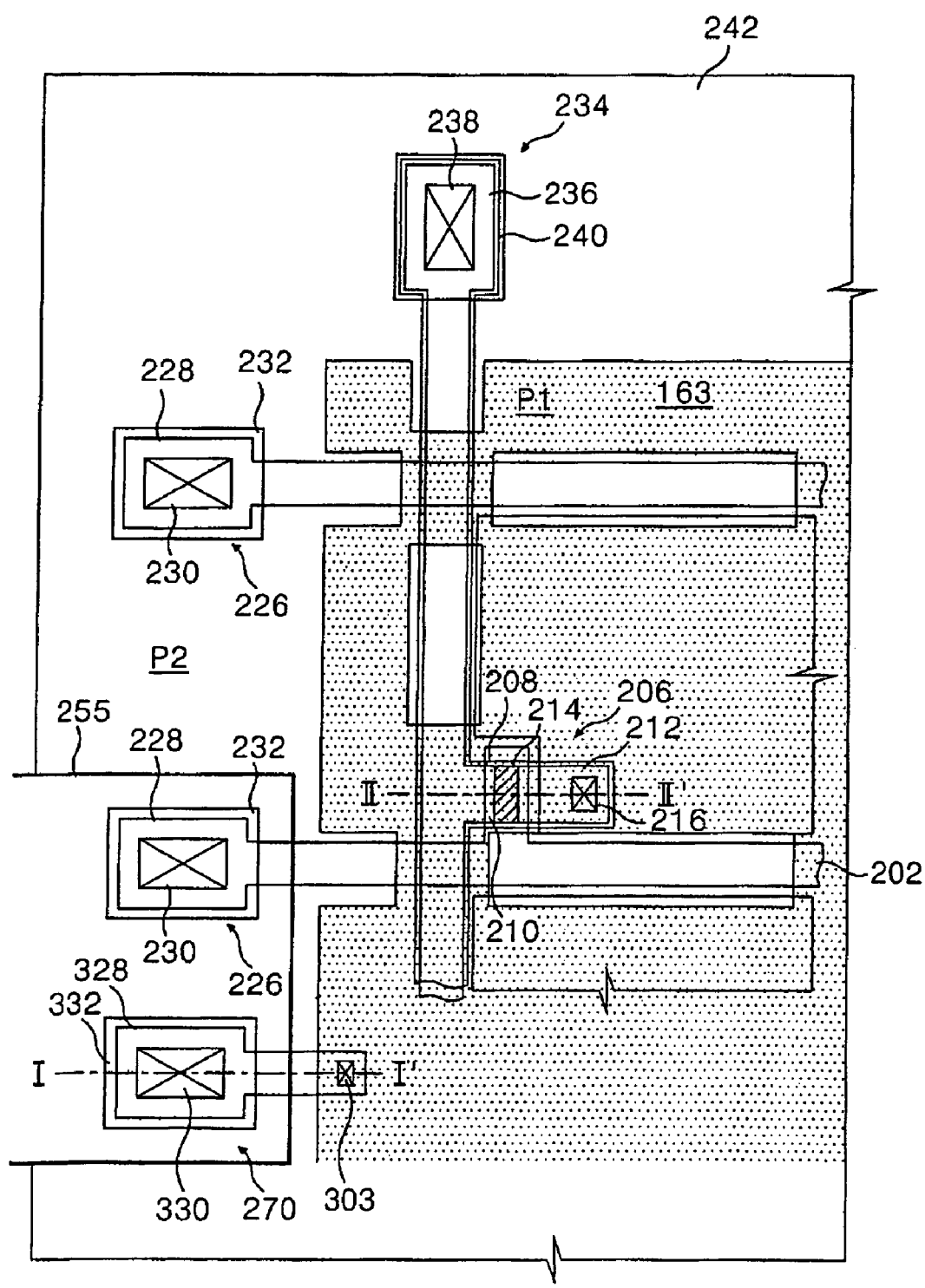
FIG. 9 illustrates a plan view of a thin film transistor array substrate of a liquid crystal display device according to a second embodiment of the present invention.

FIG. 9 illustrates a plan view of a thin film transistor array substrate of a liquid crystal display device according to a second embodiment of the present invention.

With the exception of the thermally conductive layer 163, the TFT array substrate 102a of the second embodiment of the present invention is substantially identical to the TFT array substrate 102a of the first embodiment previously illustrated by way of example in FIGS. 4 and 5. Accordingly, for the sake of brevity, a detailed description of each shared attribute will be omitted.

As described above with respect to the first embodiment, the thermally conductive layer 163 beneficially prevents liquid crystal material from becoming too cool, thereby preventing the deleterious temperature-dependent formation of bubbles. However, upon driving the LCM containing the TFT array substrate 102a of the first embodiment, signals transmitted by the gate and data lines 202 and 204 may be undesirably delayed due to parasitic capacitors constituted by the thermally conductive layer 163, the first insulating film 243, and the gate and data lines 202 and 204. Accordingly, the second embodiment of the present invention may reduce the signal delay experienced in the first embodiment by forming a TFT array substrate 102a such that portions of the thermally conductive layer 163 are absent from regions of the display area P1 occupied by portions of the gate line 202 and the data line 204.

According to principles of the present invention, the thermal signal conductor 270 may, for example, include a lower thermal signal electrode 328 connected to a thermally conductive layer 163 via a fourth contact hole 303 formed within the first insulating film 243 and an upper thermal signal electrode 332 connected to the lower thermal signal electrode 328 via a fifth contact hole 330 formed in the second insulating film 244 and the protective film 250.

According to principles of the present invention, the thermal signal conductor 270 may be connected to a tape carrier package (TCP) 255 via a conductive film 310. In one aspect of the present invention, the conductive film 310 may, for example, include electrically conductive particles (e.g., balls). Accordingly, the thermal signal conductor 270 may transmit a voltage (i.e., a thermal signal) supplied from a power source (i.e., a thermal signal generator) mounted on a printed circuit board (PCB) (not shown) to the thermally conductive layer 163 via the TCP 255. The voltage transmitted by the thermal signal conductor 270 may then be converted into heat by the thermally conductive layer 163 and supplied to the LCD panel 102 to prevent temperature-dependent formation of bubbles within liquid crystal material of the LCD panel 102.

Except for the formation of the thermally conductive layer 163, the method of fabricating the TFT array substrate 102a of the second embodiment is substantially the same as the method of fabricating the TFT array substrate 102a of the first embodiment except that the thermally conductive layer 163. For example, the thermally conductive layer 163 may be formed on the lower substrate 242 in substantially the same the manner as previously described with reference to FIG. 8A. In the second embodiment, however, portions of the formed thermally conductive layer 163 may be selectively removed by known processes in regions of the display area P1 that will be occupied by portions of subsequently formed gate and data lines 202 and 204. Accordingly, the resultant LCM may be thinner and lighter and fabricated more simply. Additionally, signal delay within the resultant LCM may be reduced.

Figure 10:
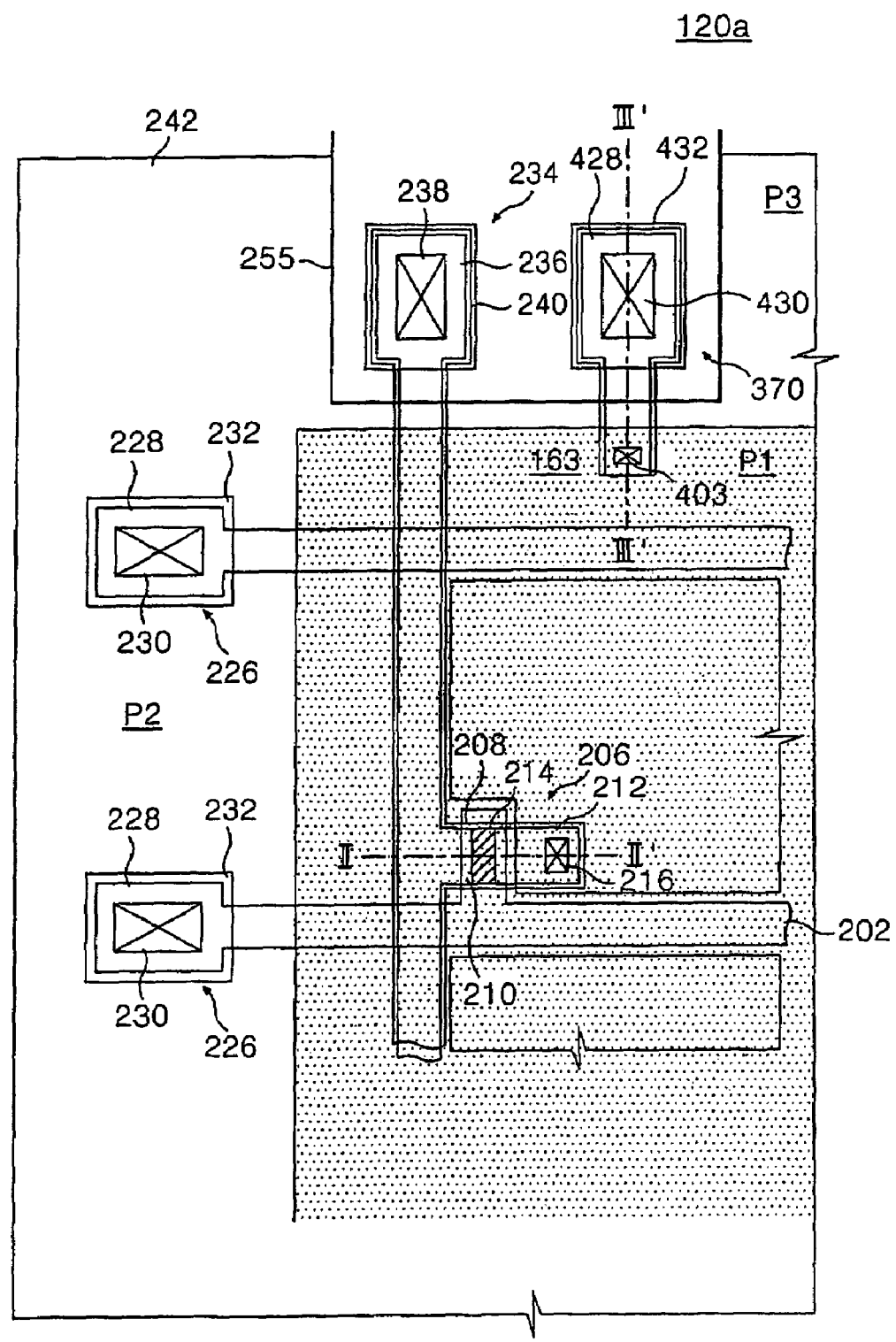
FIG. 10 illustrates a plan view of a thin film transistor array substrate of a liquid crystal display device according to a third embodiment of the present invention.
Figure 11:
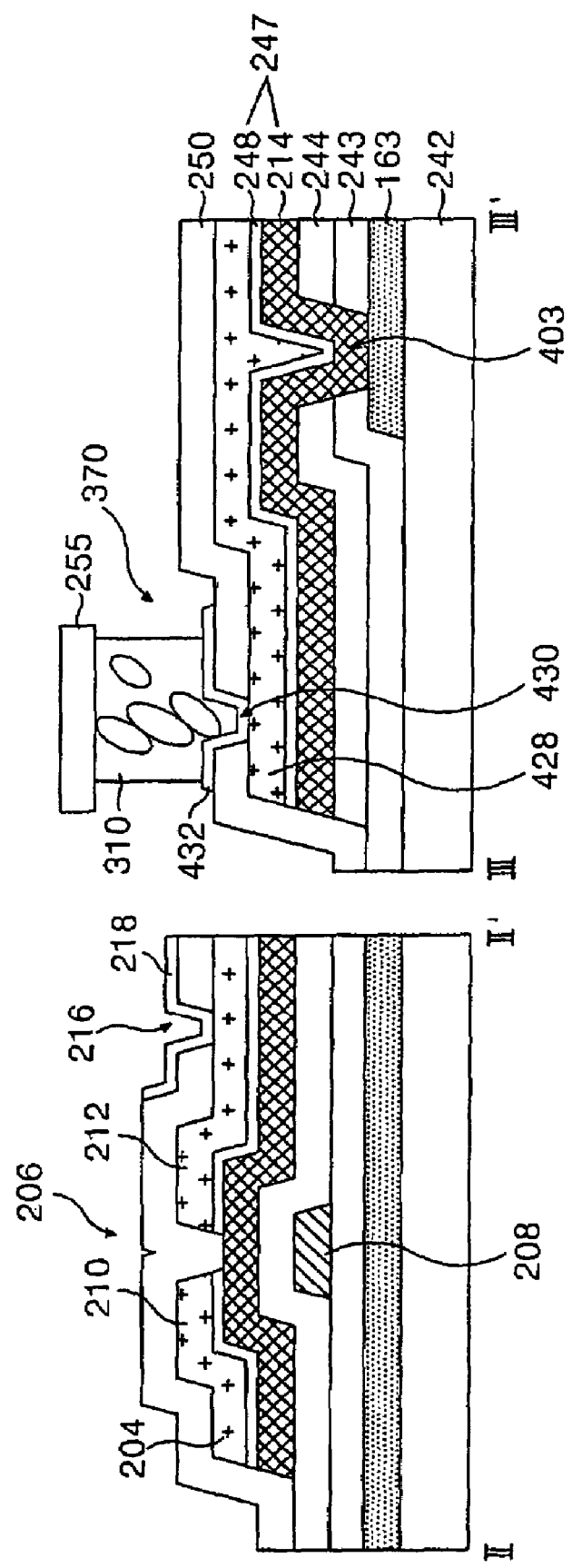
FIG. 11 illustrates a sectional view of the thin film transistor array substrate shown in FIG. 10, taken along the lines II-II' and III-III'.

FIG. 10 illustrates a plan view of a thin film transistor array substrate of a liquid crystal display device according to a third embodiment of the present invention. FIG. 11 illustrates a sectional view of the thin film transistor array substrate shown in FIG. 10, taken along the lines II-II' and III-III'.

With the exception of the difference between the lower thermal signal electrode 428 of the thermal signal conductor 370 and the lower thermal signal electrode 328 of the thermal signal conductor 270, the TFT array substrate 102a of the third embodiment is substantially identical to the TFT array substrate 102a of the first embodiment previously illustrated by way of example in FIGS. 4-6. Accordingly, for the sake of brevity, a detailed description of each shared attribute will be omitted.

Referring to FIGS. 10 and 11, the lower thermal signal electrode 428 of the thermal signal conductor 370 may be formed of the same material as the source and drain electrodes 210 and 212. In one aspect of the present invention, the lower thermal signal electrode 428 of the thermal signal conductor 370 may be formed from the same layer as the source and drain electrodes 210 and 212. In another aspect of the present invention, the lower thermal signal electrode 428 of the thermal signal conductor 370 may be formed of the same material (s) as the semiconductor pattern 247. In still another aspect of the present invention, the lower thermal signal electrode 428 of the thermal signal conductor 370 may be formed from the same layer(s) as the semiconductor pattern 247.

According to principles of the present invention, the thermal signal conductor 370 may, for example, include a lower thermal signal electrode 428 connected to a thermally conductive layer 163 via a sixth contact hole 403 formed within the first and second insulating films 243 and 244 and an upper thermal signal electrode 432 connected to the lower thermal signal electrode 428 via a seventh contact hole 430 formed within the protective film 250.

According to principles of the present invention, the thermal signal conductor 370 may be connected to a tape carrier package (TCP) 255 via a conductive film 310. In one aspect of the present invention, the conductive film 310 may, for example, include electrically conductive particles (e.g., balls). Accordingly, the thermal signal conductor 370 may transmit a voltage (i.e., a thermal signal) supplied from a power source (i.e., a thermal signal generator) mounted on a printed circuit board (PCB) (not shown) to the thermally conductive layer 163 via the TCP 255. The voltage transmitted by the thermal signal conductor 370 may then be converted into heat by the thermally conductive layer 163 and supplied to the LCD panel 102 to prevent temperature-dependent formation of bubbles within liquid crystal material of the LCD panel 102.

FIGS. 12A to 12F illustrate sectional views of a method of fabricating the thin film transistor array substrate shown in FIG. 11.

Figure 12A:
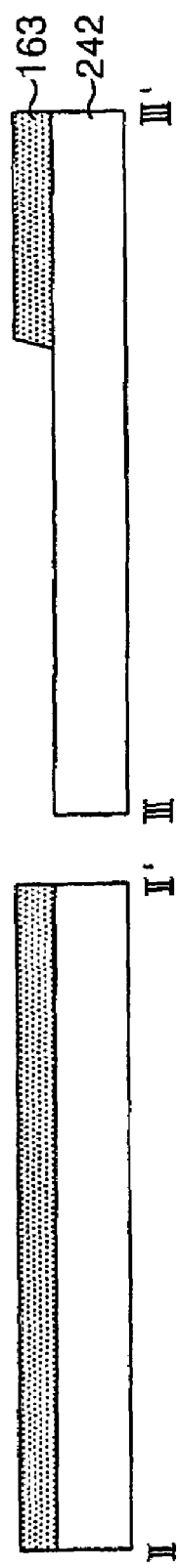

Referring to FIG. 12A, the thermally conductive layer 163 may be formed on the lower substrate 242. In one aspect of the present invention, the thermally conductive layer 163 may be formed through a deposition method such as sputtering, or the like. In another aspect of the present invention, the thermally conductive layer 163 may be formed of an electrically conductive material. In still another aspect of the present invention, the thermally conductive layer 163 may be formed of an electrically conductive material such as indium tin oxide (ITO), or the like.

Figure 12B:
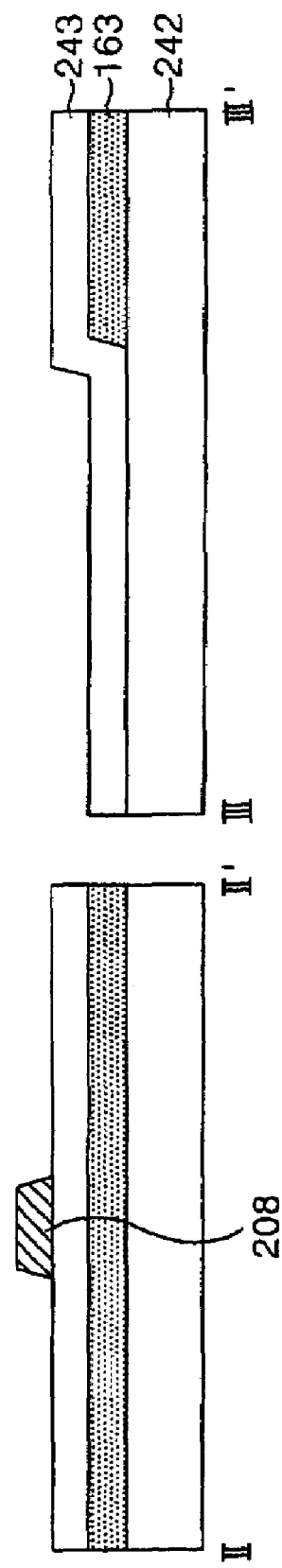

Referring to FIG. 12B, the first insulating film 243 may be formed on the lower substrate 242 and the thermally conductive layer 163. In one aspect of the present invention, the first insulating film 243 may include an inorganic insulating material such as silicon oxide (SiOx), silicon nitride (SiNx), or the like. A gate metal layer may be formed over the lower substrate 242 and on the first gate insulating film. In one aspect of the present invention, the gate metal layer may be formed through a deposition method such as sputtering, or the like. Subsequently, the gate metal layer may be patterned via photolithography and etching processes using a mask to form gate patterns including the gate lines 202 and the gate electrode 208. In one aspect of the present invention, the gate metal layer may include chrome Cr, molybdenum Mo, aluminum Al, or the like, or alloys or layered combinations (e.g., two layers) thereof.

Referring to FIG. 12C, the second insulating film 244 may be formed over the lower substrate 242 and on the first insulating film 243, the gate lines 202, and the gate electrode 208. In one aspect of the present invention, the second insulating film 244 may include an inorganic insulating material such as silicon oxide (SiOx), silicon nitride (SiNx), or the like. Further, the sixth contact hole 403 may be formed in the first and second insulating films 243 and 244, respectively, to expose a portion of the thermally conductive layer 163. In one aspect of the present invention, the sixth contact hole 403 may be formed by photolithography and etching processes using a mask.

Referring to FIG. 12D, a semiconductor layer, a doped semiconductive layer, and a source/drain metal layer may be sequentially formed over the lower substrate 242, on the second insulating film 244, and within the sixth contact hole 403. In one aspect of the present invention, the semiconductor layer may be used to form the active layer 214 and may comprise an amorphous silicon layer. In another aspect of the present invention, the doped semiconductive layer may be used to form the ohmic contact layer 248 and may comprise an n+ amorphous silicon layer. In yet another aspect of the present invention, the source/drain metal layer may include molybdenum (Mo), titanium (Ti), tantalum (Ta), or the like, or any alloy or layered combination thereof.

After sequential formation of the semiconductor layer, the doped semiconductive layer, and the source/drain metal layer, source/drain electrodes 210 and 212, respectively, may be formed by patterning the source/drain metal layer via a photolithography process and a photoresist mask. In one aspect of the present invention, the mask used in forming the source and drain electrodes 210 and 212, respectively, may comprise a diffractive exposure mask having a diffractive exposure area arranged in correspondence with the channel of the TFT. Thus, a portion of the mask arranged over the channel of the TFT may be lower in height than a portion of the mask arranged over the source/drain area of the TFT. After formation of the mask, the source/drain metal layer may be patterned by a wet etching process using the photoresist pattern as a mask. Upon completion of the patterning, the data line 204, the source electrode 210, and the drain electrode 212, and the lower thermal signal electrode 428, are simultaneously formed.

After patterning the source/drain metal layer to form the data line 204, the source electrode 210, the drain electrode 212, and the lower thermal signal electrode 428, the semiconductor layer and the doped semiconductive layer may be simultaneously patterned to form the active layer 214 and the ohmic contact layer 248, respectively. In one aspect of the present invention, the semiconductor layer and the doped semiconductive layer may be patterned via a dry etching process using the same photoresist pattern as was used to form the source and drain electrodes 210 and 212 and the lower thermal signal electrode 428.

After patterning the semiconductor layer and doped semiconductive layer to form the active layer 214 and the ohmic contact layer 248, the portion of the photoresist pattern arranged over the channel of the TFT (i.e., the portion of the photoresist having the relatively lower height) may be removed in an ashing process. Subsequently, portions of the source/drain metal layer and the ohmic contact layer 248 arranged over the channel of the TFT may be etched in a dry etching process to expose the portion of the active layer 214 corresponding to the channel of the TFT and to separate the source electrode 210 from the drain electrode 212. After exposing the active layer 214 and separating the source and drain electrodes, the residual photoresist pattern may be removed in a stripping process.

Figure 12E:
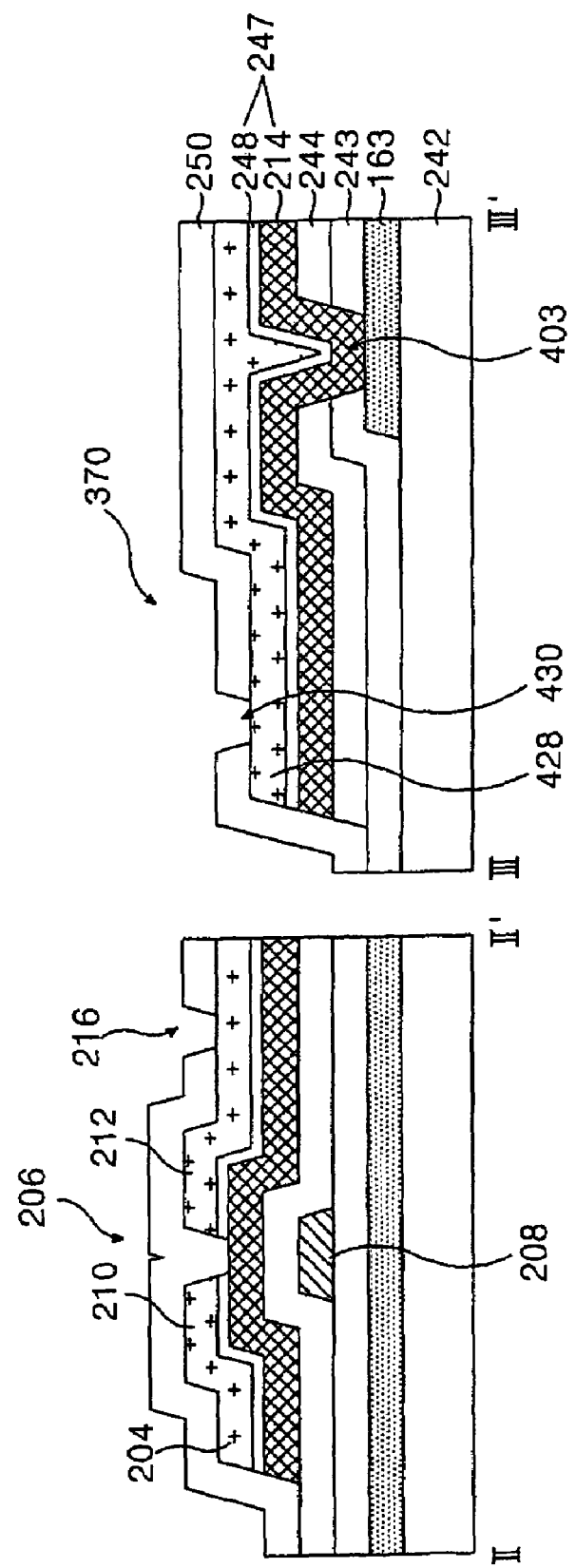

Referring to FIG. 12E, the protective film 250 may be formed over the entire surface of the lower substrate 242 and on the second insulating film 244, the source/drain electrodes, and the lower thermal signal electrode 428. In one aspect of the present invention, the protective film 250 may be formed by a deposition method such as PECVD. In another aspect of the present invention, the protective film 250 may be formed of the same inorganic insulating material as the first and second insulating film 243 and 244, or from an organic insulating material such as an acrylic organic compound having a low dielectric constant (e.g., BCB, PFCB, etc.), or the like. The first and seventh contact holes 216 and 430 may be formed in the protective film 250 by photolithography and etching processes using a mask. Accordingly, the first contact hole 216 may expose a portion of the drain electrode 212 and the seventh contact hole 430 may expose a portion of the lower thermal signal electrode 428.

Figure 12F:
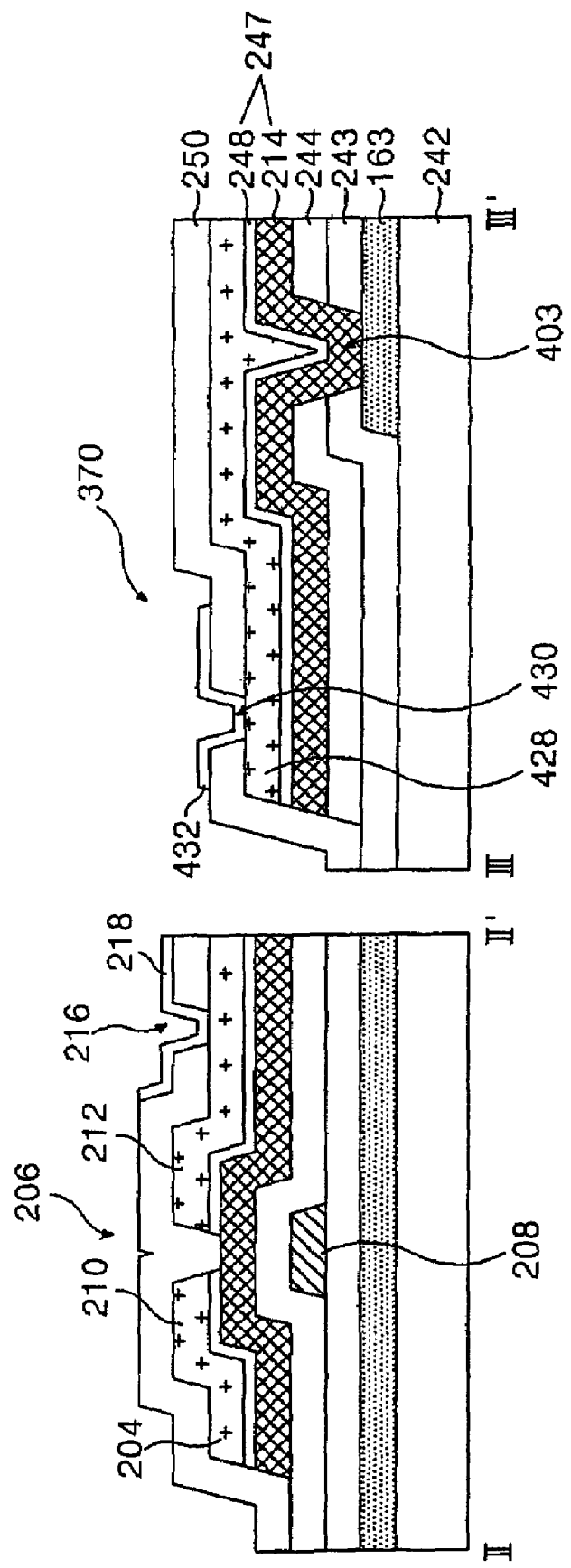

Referring to FIG. 12F, a transparent, electrically conductive material may be formed on the protective film 250 and within the first and seventh contact holes 216 and 430. In one aspect of the present invention, the transparent, electrically conductive material may be formed through a deposition method such as sputtering, or the like. In another aspect of the present invention, the transparent, electrically conductive material may, for example, include indium tin oxide (ITO), tin oxide (TO), indium zinc oxide (IZO), or the like. Subsequently, the formed transparent, electrically conductive material may be patterned via the photo lithography and etching processes using a mask to form the pixel electrode 218 and the upper thermal signal electrode 432. According to principles of the present invention, the pixel electrode 218 may be electrically connected to the drain electrode 212 via the first contact hole 216 while the upper thermal signal electrode 432 may be electrically connected to the lower thermal signal electrode 428 via the seventh contact hole 430.

As described above with respect to FIGS. 10-12F, the thermally conductive layer 163 may be formed directly on the lower substrate 242 of the TFT array substrate 102a. Accordingly, the separate supporting substrates and thermal conducting structures, such as those described in the related art, and their accompanying fabrication processes, are not required. Accordingly, the resultant LCM may be thinner and lighter and fabricated more simply.

According to principles of the present invention, the thermally conductive layer may be formed directly on the lower substrate of the thin film transistor array substrate. Accordingly, separate supporting substrates and thermally conductive structures, such as those described in the related art, and the processes required to fabricate them, are not required. Accordingly, the resultant LCM may be thinner and lighter and fabricated more simply.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
 a liquid crystal display panel having first and second substrates bonded to each other and separated from each other by liquid crystal material, wherein at least one of the first and second substrates includes a display area and a non-display area, the liquid crystal panel including a plurality of gate lines crossing a plurality of data lines to define pixels within the display area;
 a thermally conductive layer on any one of the first and second substrates, wherein the thermally conductive layer is formed within the display area, wherein the thermally conductive layer prevents a temperature-dependent formation of bubbles within the liquid crystal material;
 a thermal signal conductor on any one of the first and second substrates and connected to the thermally conductive layer;
 a first insulating film on the thermally conductive layer; and
 a protective film,
 wherein the thermal signal conductor includes:
  a first thermal signal electrode connected to the thermally conductive layer, wherein the first insulating film is between the first thermal signal electrode and the thermally conductive layer; and
  a second thermal signal electrode connected to the first thermal signal electrode and supplied with a thermal signal from a thermal signal generator, wherein the protective film is between the second and first thermal signal electrodes, wherein the second thermal signal electrode is formed on the non-display area,
 wherein the thermally conductive layer is excluded from regions of the display area occupied by portions of the gate and data lines.

2. The liquid crystal display device according to claim 1, wherein the thermal signal conductor is within the non-display area.

3. The liquid crystal display device according to claim 1, further comprising:
 a printed circuit board;
 the thermal signal generator on the printed circuit board, wherein the thermal signal generator supplies a thermal signal to the thermal signal conductor; and
 a tape carrier package connected between the printed circuit board and the thermal signal conductor.

4. The liquid crystal display device according to claim 3, wherein two or more thermal signal conductors are connected to one tape carrier package.

5. The liquid crystal display device according to claim 1, further including:
 a first contact hole within the first insulating film exposing the thermally conductive layer;
 a gate pattern on the first insulating film, the gate pattern including a gate electrode and a gate line;
 a second insulating film on the gate pattern;

a source/drain pattern on the second insulating film, the source/drain pattern including a data line, a source electrode, and a drain electrode,
wherein the protective film is on the source/drain pattern;
a second contact hole within the protective film exposing the drain electrode; and
a pixel electrode connected to the drain electrode via the second contact hole.

6. The liquid crystal display device according to claim 5, wherein the first contact hole is in both the first insulating film and the second insulating film exposing the thermally conductive layer.

7. The liquid crystal display device according to claim 6, wherein the first thermal signal electrode includes the same material as the gate pattern.

8. The liquid crystal display device according to claim 5, wherein the second insulating film is between the first thermal signal electrode and the thermally conductive layer.

9. The liquid crystal display device according to claim 8, wherein the first thermal signal electrode includes the same material as the source/drain pattern.

10. The liquid crystal display device according to claim 1, wherein the thermally conductive layer includes a transparent conductive material.

11. A fabricating method of a liquid crystal display device having a liquid crystal display panel with first and second substrates, each of the first and second substrates having a display area and a non-display area, the first and second substrates being bonded together and separated from each other by liquid crystal material, and the liquid crystal panel including a plurality of gate lines crossing a plurality of data lines to define pixels within the display area, the method comprising:
forming a thermally conductive layer within the display area on any one of the first and second substrates to prevent a temperature-dependent formation of bubbles within the liquid crystal material, wherein forming the thermally conductive layer includes forming the thermally conductive layer to exclude regions of the display area occupied by portions of the gate and data lines;
forming a thermal signal conductor on any one of the first and second substrates;
connecting the thermal signal conductor to the thermally conductive layer;
forming a first insulating film on the thermally conductive layer; and
forming a protective film;
wherein forming the thermal signal conductor includes:
connecting a first thermal signal electrode to the thermally conductive layer such that the first insulating film is between the first thermal signal electrode and the thermally conductive layer; and
connecting a second thermal signal electrode to the first thermal signal electrode and forming the protective film between the first and second thermal signal electrodes,
wherein the second thermal signal electrode is formed on the non-display area, wherein a thermal signal from a thermal signal generator is supplied to the second thermal signal electrode.

12. The fabricating method according to claim 11, further comprising forming the thermal signal conductor within the non-display area.

13. The fabricating method according to claim 11, further comprising:
forming a printed circuit board;
mounting the thermal signal generator on the printed circuit board, wherein the thermal signal generator supplies a thermal signal to the thermal signal conductor; and
connecting the printed circuit board with the thermal signal conductor via a tape carrier package.

14. The fabricating method according to claim 13, further comprising connecting two or more thermal signal conductors to one tape carrier package.

15. The fabricating method according to claim 11, further comprising:
forming a first contact hole within the first insulating film exposing the thermally conductive layer;
forming a gate pattern on the first insulating film, the gate pattern including a gate electrode and a gate line;
forming a second insulating film on the gate pattern;
forming a source/drain pattern on the second insulating film, the source/drain pattern including a data line, a source electrode and a drain electrode;
forming a second contact hole within the protective film exposing the drain electrode; and
forming a pixel electrode connected to the drain electrode via the second contact hole;
wherein the protective film is formed on the source/drain pattern.

16. The fabricating method according to claim 15, wherein the first insulating film is formed between the first thermal signal electrode and the thermally conductive layer and wherein forming the electrode insulating film includes forming the second insulating film between the second and first thermal signal electrodes.

17. The fabricating method according to claim 16, further including forming the first thermal signal electrode from the same material as the gate pattern.

18. The fabricating method according to claim 15, wherein the first and second insulating films are formed between the first thermal signal electrode and the thermally conductive layer.

19. The fabricating method according to claim 18, further including forming the first thermal signal electrode from the same material as the source/drain pattern.

20. The fabricating method according to claim 11, including forming the thermally conductive layer from a transparent conductive material.

* * * * *